May 3, 1966     K. G. LUSHER     3,249,466
MAGNETIC SOLDER GLASS COATINGS AND METHOD
Filed Feb. 16, 1960
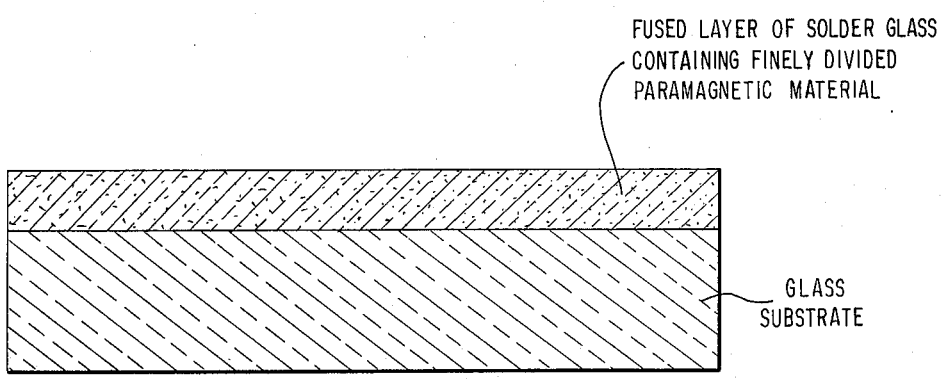
FUSED LAYER OF SOLDER GLASS CONTAINING FINELY DIVIDED PARAMAGNETIC MATERIAL
GLASS SUBSTRATE
*INVENTOR*
KENNETH G. LUSHER
BY *W. A. Schaich and Charles S. Lynch*
*ATTORNEYS*

3,249,466
MAGNETIC SOLDER GLASS COATINGS AND METHOD
Kenneth G. Lusher, Perrysburg, Ohio, assignor to Owens-Illinois Inc., a corporation of Ohio
Filed Feb. 16, 1960, Ser. No. 8,919
3 Claims. (Cl. 117—124)

This invention relates to magnetic solder glass coatings. In a more specific aspect the invention relates to a film or coating of a solder glass composition having magnetic properties laminated or bonded to a substrate. In another aspect the invention relates to a method of preparing a laminate comprising a coating of a magnetic solder glass composition bonded to a substrate.

It is an object of the invention to provide a laminate of a solder glass containing dispersed particles of a material having magnetic properties bonded to a substrate, whereby the magnetic material can be controlled to have a lower conductivity than a continuous film or coating of the same magnetic material. It is a particular object to provide such a laminate wherein the substrate is a glass having a substantially higher fiber softening point than said solder glass.

Other objects, as well as aspects and advantages, of the invention will become apparent from the following disclosure.

In the drawing, the single figure is a cross-sectional view of the laminated article of this invention.

According to the invention there is provided a film or coating of a solder glass, or low melting glass, such coating containing dispersed therein at least 10 weight percent of a powder of a paramagnetic material having a melting point above the fiber softening point of the solder glass, bonded to a substrate. In a particular aspect of the invention the substrate is a glass having a fiber softening point substantially greater than said solder glass.

In general, however, the substrate can be a metal, or a ceramic, etc., such as mullite or aluminum, for instance, or any solid substrate not deleteriously affected by temperatures necessary to apply and fuse the solder glass.

The solder glass employed can be any glass having a fiber softening point less than 450° C. in the vitreous state. A type of solder glass found to be applicable include solder glasses containing lead oxide and boric oxide, with or without zinc oxide, and several optional ingredients as follows:

| Ingredient: | Percent by weight |
|---|---|
| PbO | 63–80 |
| $B_2O_3$ | 6–21 |
| ZnO | 0–16 |
| BaO | 0–8 |
| $SiO_2$ | 0–6 |
| CuO | 0–10 |
| $Ag_2O$ | 0–5 |
| $Al_2O_3$ | 0–3 |

Some solder glasses falling within the above ranges are true vitreous types, while others are the newer so-called devitrifiable types. This means that the glasses can be melted as glasses but if held at a temperature below this liquidus temperature for a short time, they largely devitrify to form higher melting materials. Either type of solder glass is applicable in the present invention. The devitrified type after devitrification or crystallization is known, for want of better and more descriptive terminology, as devitrified solder glass. In a sense this is somewhat contradictory terminology since a crystalline material is no longer a glass. However, it is believed that the term is useful and justified since it indicates the history of the crystalline or devitrified material and further indicates that the material, although an essentially crystalline material, is of a composition capable of existing in the vitreous state. With this explanation is is noted that the broad term "solder glass" in the article claims is meant to generically include both vitreous and devitrified glasses. A particular group of devitrifiable solder glasses which can be used are glasses having the following composition:

| Ingredient: | Percent by weight |
|---|---|
| PbO | 70–80 |
| $B_2O_3$ | 7–10 |
| ZnO | 7–14 |
| $SiO_2$ | 1–3 |
| BaO | 0–8 |
| CuO | 0–8 |
| $Al_2O_3$ | 0–3 |

The magnetic material is employed in an amount of at least 10 percent by weight of the total of the solder glass plus the magnetic material, generally 10 to 90 percent, although usually at least 15 percent is used. Quite often this percentage lies in the range of 15 to 35 weight percent. Any finely divided paramagnetic solid having a magnetic susceptibility greater than $100 \times 10^{-6}$ c.g.s units is applicable. Of course, the invention is specifically applicable to ferro-magnetic materials, these being included within the class paramagnetic materials. For example, iron, cobalt and nickel and their oxides and alloys can be used, as well as the magnetic yttrium garnets, the magnetic barium ferrites ($BaO \cdot 6Fe_2O_3$) and magnetic lead ferrites ($Pb \cdot 6Fe_2O_3$). Specific iron alloys that can be mentioned are 24–30 wt. percent Ni, 9–13 wt. percent Al, balance iron; the foregoing alloy also containing 5–10 wt. percent Co; 12 wt. percent Co; 16 wt. percent Mo, balance iron. Other materials include the well-known Co-Ni-Al alloys, the magnetic steels, the magnetic iron-silica-alumina alloys, to name a few. Other applicable magnetic materials include the metals Gd, Dy and Nd.

While the solid magnetic material should be finely divided, the particle size should not be so small that magnetic properties are destroyed, as is well known in the art. Generally the particle size employed herein is at least 3 microns in diameter.

When the substrate employed according to the present invention is a glass, it usually has a fiber softening point above 620° C.

In preparing the solder glass-substrate laminate of the invention, the substrate article is coated with an intimate mixture of a powdered solder glass in the vitreous state and the finely divided magnetic material, either with or without a liquid binder material to form a slurry or paste. The coated article is then fired to below the liquidus temperature to fuse the solder glass and bond the resultant film or layer to the substrate. During the firing step, if a devitrifiable solder glass is employed, devitrification can take place, as is well known. After firing the composite laminated article is allowed to cool.

The laminated structures of the present invention are useful in a wide variety of applications to take advantage of their magnetic properties. For instance, a coating or film of a magnetic material, such as iron, can be applied to the outside of a glass television tube as the substrate to shield the electron beam of the television tube from being deflected by external magnetic fields.

As another example, it can be mentioned that structures of the invention can be employed as a computer core unit in a matrix memory unit. These core units can be made by exteriorly coating glass rods about 1 mm. I.D. and 1½ mm. O.D. with a solder glass containing dispersed paramagnetic material. The coated glass rod then is cut into appropriate short lengths (about ½ mm.) to form the computer core rings, which are then assembled in the usual manner with appropriate windings.

The following examples are merely illustrative and are not to be taken as limiting.

In the following Examples 1–4 the devitrifiable solder glass employed had the following composition:

| Ingredient: | Percent by weight |
|---|---|
| PbO | 7.62 |
| $B_2O_3$ | 9 |
| ZnO | 12.8 |
| $SiO_2$ | 2 |

This solder glass has a fiber softening point of about 372 C. The molten solder glass was poured onto a water-cooled chute and formed into chips through a water-cooled set of rolls. The chips of solder glass were then ground in a ceramic ball mill, and the screen analysis (U.S. standard sieve) was as follows:

| Screen size: | Percent of total by weight |
|---|---|
| +200 mesh | 10.4 |
| +270 mesh | 5.8 |
| +400 mesh | 13.8 |
| −400 mesh | 70.4 |

In applying the solder glass to the base glass to which a film of the iron-containing solder glass was bonded in the following examples, the dry solder glass-iron powder mixture was blended with a vehicle, employing about 14 ml. of vehicle to about 55 grams of the dry solder glass-iron mixture. This suspension of solids in the vehicle was made just prior to spraying. The base glass was, of course, thoroughly cleaned before spraying and the spraying was accomplished using a De Vilbiss type EGA spray gun with a No. 390 spray cap, employing about 25 lbs. of air pressure.

After spraying the film was allowed to dry at room temperature for several minutes, after which the films were fired at 440° C. in an electric oven for one hour. The heating rate was about 10° C./min.

In all of the examples herein the iron powder employed had the following Tyler Screen analysis:

| Screen size: | Percent of total by weight |
|---|---|
| +250 mesh | 0.5 |
| +325 mesh | 3.5 |
| −325 mesh | 96 |

The compositions of the various vehicles employed to form the suspensions are as follows:

Vehicle A—1½% nitrocellulose in amyl acetate
Vehicle B—50 parts distilled water, 50 parts isopropanol
Vehicle C—59.9 parts distilled water, 39.9 parts ethylene glycol, 0.2 part of 10% aqueous magnesium sulfate solution.

*Example 1*

In this example a film of solder glass containing iron was made using 80 parts by weight of the powdered solder glass before described and 20 parts by weight of the powdered iron. The application and bonding to the parent glass was as before described. The vehicle employed in this example was vehicle C. The base glass had a fiber softening joint of about 672° C. and a coefficient of thermal expansion of about $102 \times 10^{-7}$/° C. (0–300° C.) and a composition as follows:

| Ingredient: | Percent by weight |
|---|---|
| $SiO_2$ | 64.4 |
| $Al_2O_3$ | 4.3 |
| $As_2O_3$ | 0.12 |
| $Sb_2O_3$ | 0.18 |
| $Na_2O$ | 8.2 |
| $K_2O$ | 10 |
| $F_2$ | 0.3 |
| CaO | 1.4 |
| MgO | 0.6 |
| BaO | 10.4 |
| $Fe_2O_3$ | 0.05 |
| MnO | 0.1 |
| $Co_3O_4$ | 0.00046 |
| NiO | 0.0043 |

The average film thickness of the fired film was about .007 inch and its surface resistance was about 330,000 ohms per square. The solder glass was substantially devitrified. The film was tested with a magnet and was found to have magnetic properties.

*Example 2*

Another magnetic film was made in the same manner as described with respect to Example 1, except that 30 parts of iron powder were mixed with 70 parts of the solder glass and the vehicle employed was vehicle A. The same base glass as before was employed. The surface resistance of the film was about 3400 ohms per square. The film also had magnetic properties.

*Example 3*

Example 2 was repeated except that 21½ parts of the iron powder and 78½ parts of the solder glass were used. The resulting fired, devitrified, and bonded film had a surface resistance of about 100,000 ohms per square, and was also magnetic in character as shown by testing with a magnet.

*Example 4*

Example 2 was repeated except that 23 parts of iron powder were mixed with 77 parts of the solder glass, and the vehicle used was vehicle B. The resulting fired, devitrified and bonded solder glass film had a surface resistance of about 50,000 ohms per square, and was found to have magnetic properties when tested with a magnet.

*Example 5*

Example 4 was repeated except that the 77 parts of solder glass employed were of a vitreous type of solder glass, and the vehicle employed was vehicle A. The film had magnetic properties as shown by testing with a magnet. The solder glass composition was as follows:

| Ingredient: | Percent by weight |
|---|---|
| PbO | 71.1 |
| $B_2O_3$ | 15.4 |
| ZnO | 9 |
| CuO | 1.9 |
| $SiO_2$ | 2.1 |

Its fiber softening point was about 770° F. and its coefficient of thermal expansion was about $90 \times 10^{-7}$.

As will be evident to those skilled in the art, various modifications of this invention can be made or followed in the light of the foregoing disclosure and discussion without departing from the spirit and scope of the disclosure or from the scope of the claims.

I claim:
1. A method of preparing a laminated article comprising applying to a glass base substrate a coating of an intimate admixture of a finely divided solder glass having a fiber-softening point in the vitreous state below 450° C. and from 15–35 weight percent of a finely divided paramagnetic material having a magnetic susceptibility greater than $100 \times 10^{-6}$ c.g.s. units, heating said coating to a temperature and for a time sufficient to fuse said coating and bond same to said glass substrate, and allowing said article to cool, the temperature of said heating being such that it does not deleteriously affect the glass substrate.

2. The method as defined in claim 1 wherein said coating is fired at a heating rate of about 10° C. per minute to a temperature of 440° C. for a period of 1 hour.

3. A laminated article comprising a base glass substrate, and bonded to said substrate a magnetic coating comprising a fused layer of solder glass containing from 15–35 weight percent of a finely divided paramagnetic material having a magnetic susceptibility greater than $100 \times 10^{-6}$ c.g.s. units dispersed therein, the solder glass having a fiber-softening point, below 450° C., and the base glass having a fiber-softening point over 620° C.

References Cited by the Examiner

UNITED STATES PATENTS

| | | | |
|---|---|---|---|
| 2,343,630 | 3/1944 | Atwood | 117—31 X |
| 2,581,765 | 1/1952 | Mann et al. | |
| 2,792,563 | 5/1957 | Rajchman | 340—174 |
| 2,846,655 | 8/1958 | Iversen | 252—62.5 |
| 2,882,187 | 4/1959 | Kwate | 117—23 |
| 2,886,476 | 5/1959 | Dumesnil et al. | 117—125 X |
| 3,075,860 | 1/1963 | Veres | 117—227 |

FOREIGN PATENTS 811,160  4/1959  Great Britain.

RICHARD D. NEVIUS, *Primary Examiner.*

J. B. SPENCER, F. W. SHERLING, M. KAPLAN, W. D. MARTIN, *Assistant Examiners.*